Aug. 2, 1938.  C. A. FLOOD  2,125,626
PRINTING AND PINNING MACHINE
Filed May 29, 1936  9 Sheets-Sheet 1
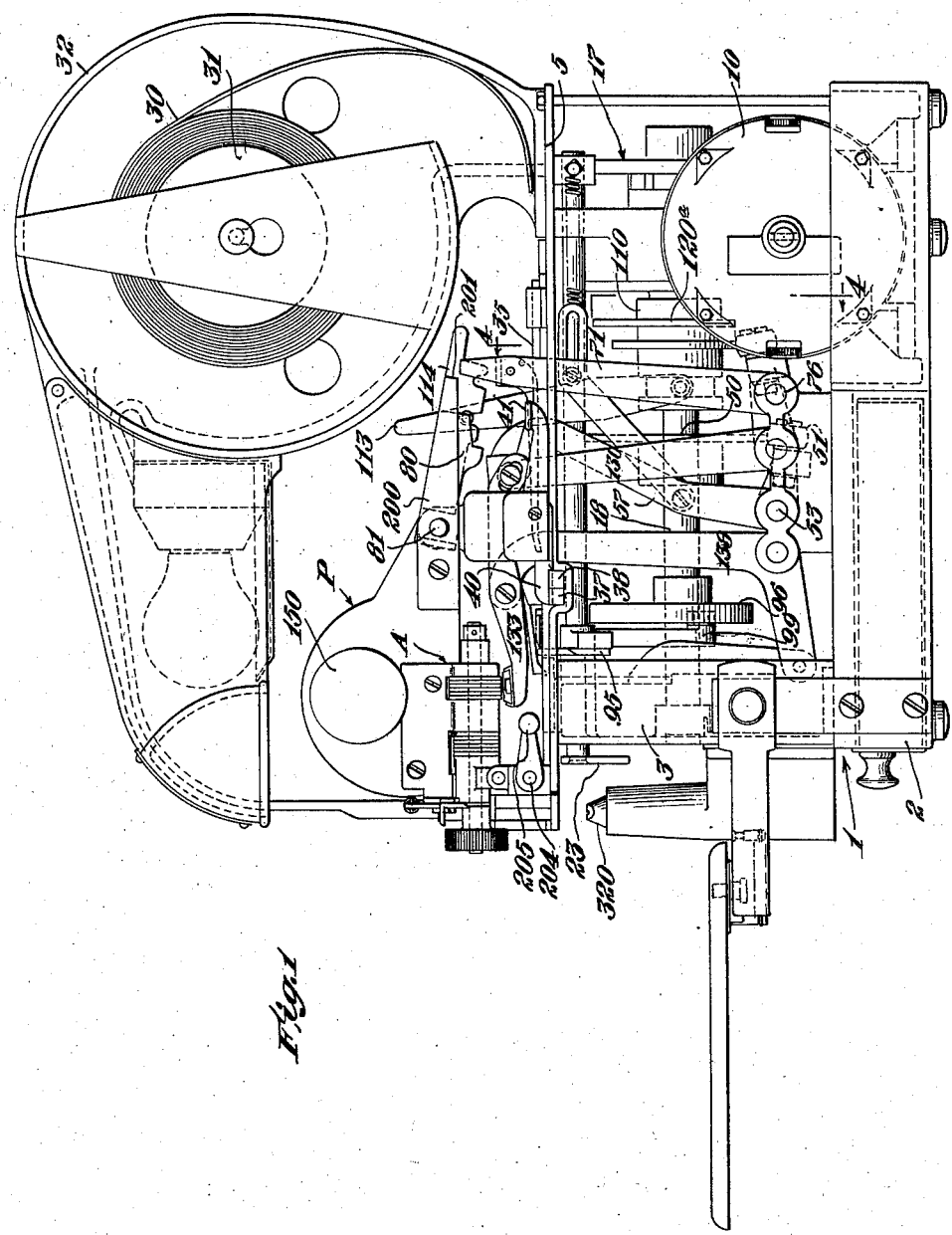

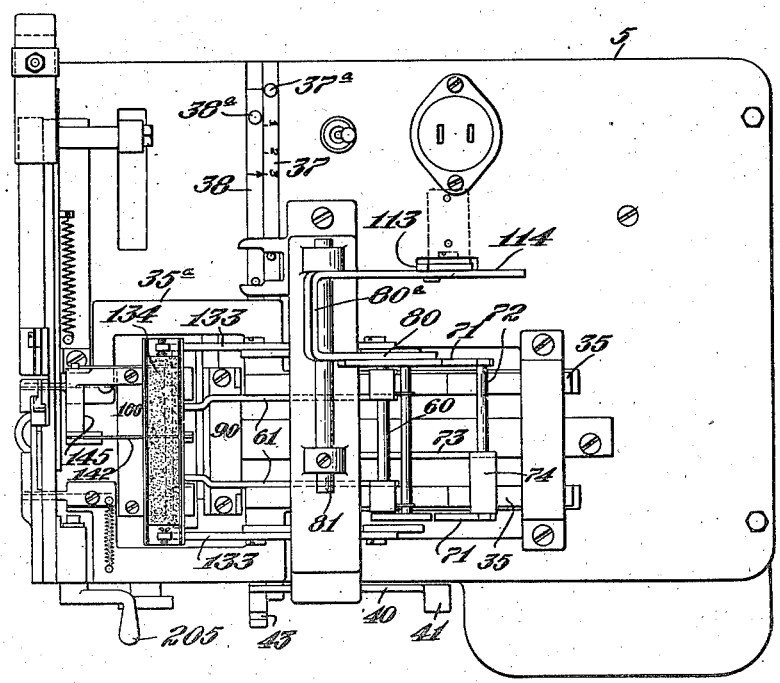
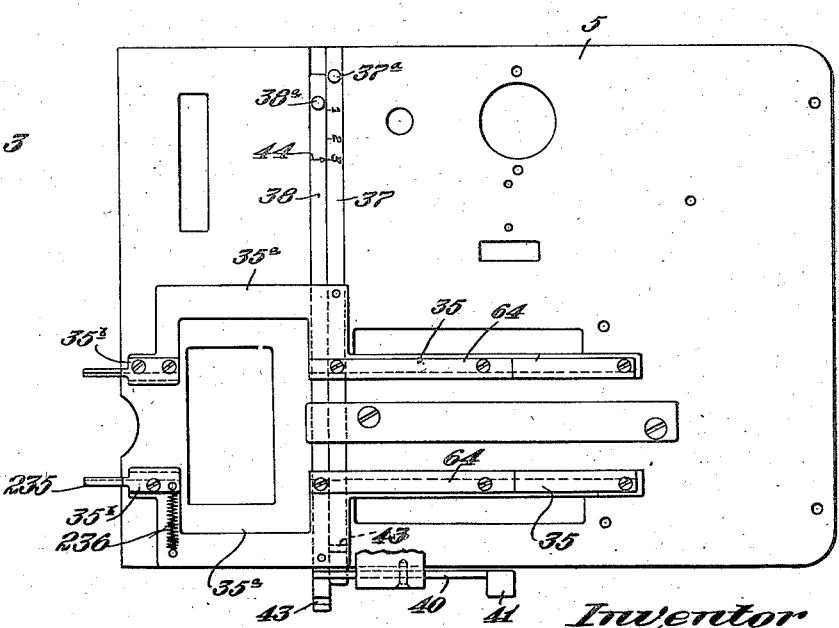

Aug. 2, 1938.   C. A. FLOOD   2,125,626
PRINTING AND PINNING MACHINE
Filed May 29, 1936   9 Sheets-Sheet 3

Inventor
Carl A. Flood
by Roberts, Cushman & Woodberry
Attys.

Inventor
Carl A. Flood
by Roberts, Cushman & Woodbury
Att'ys.

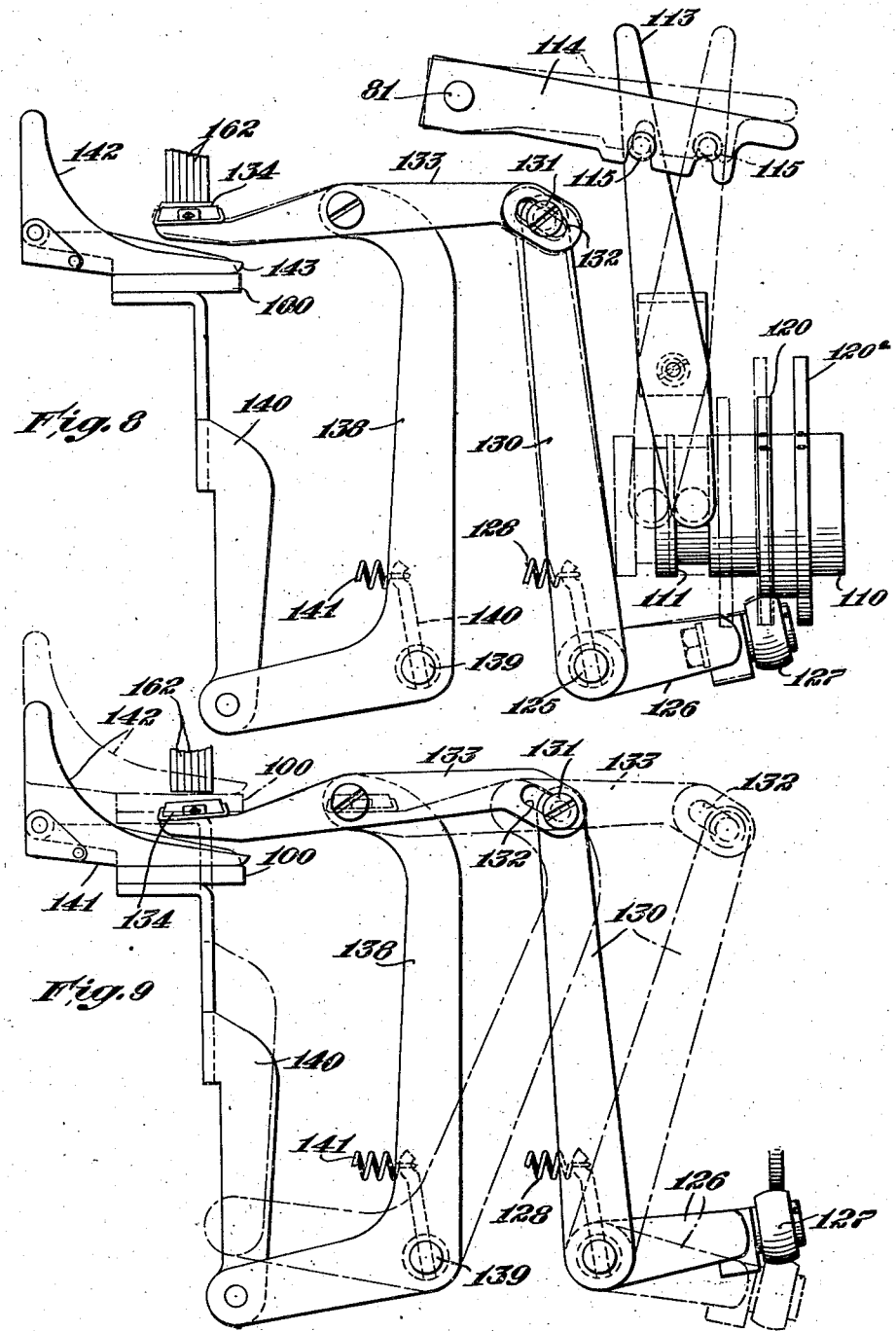

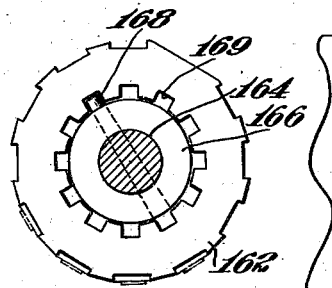
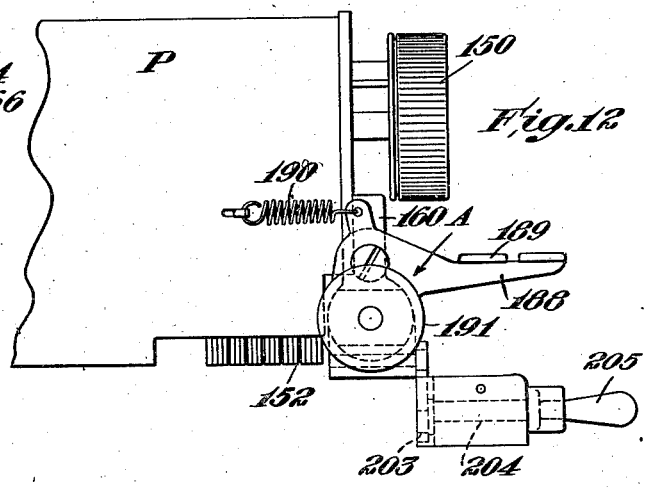
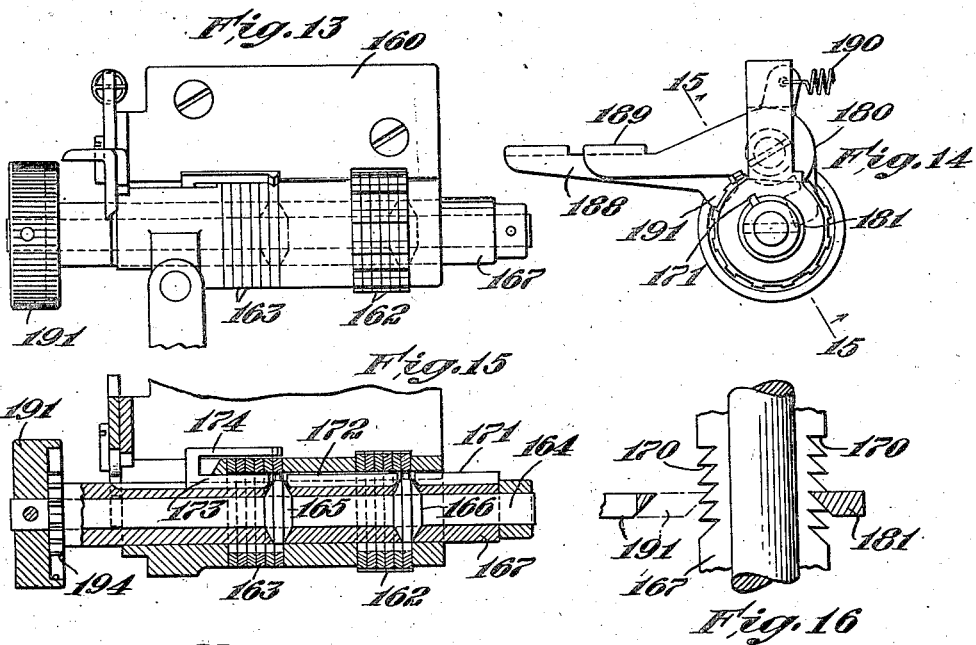
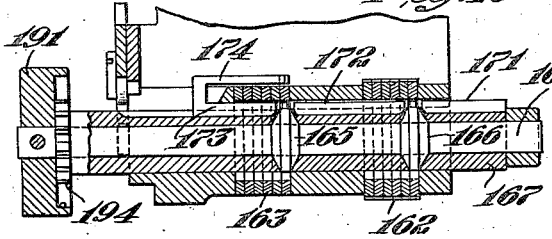
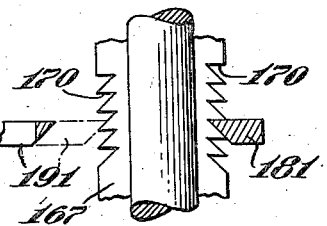
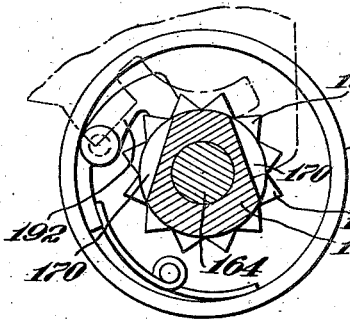

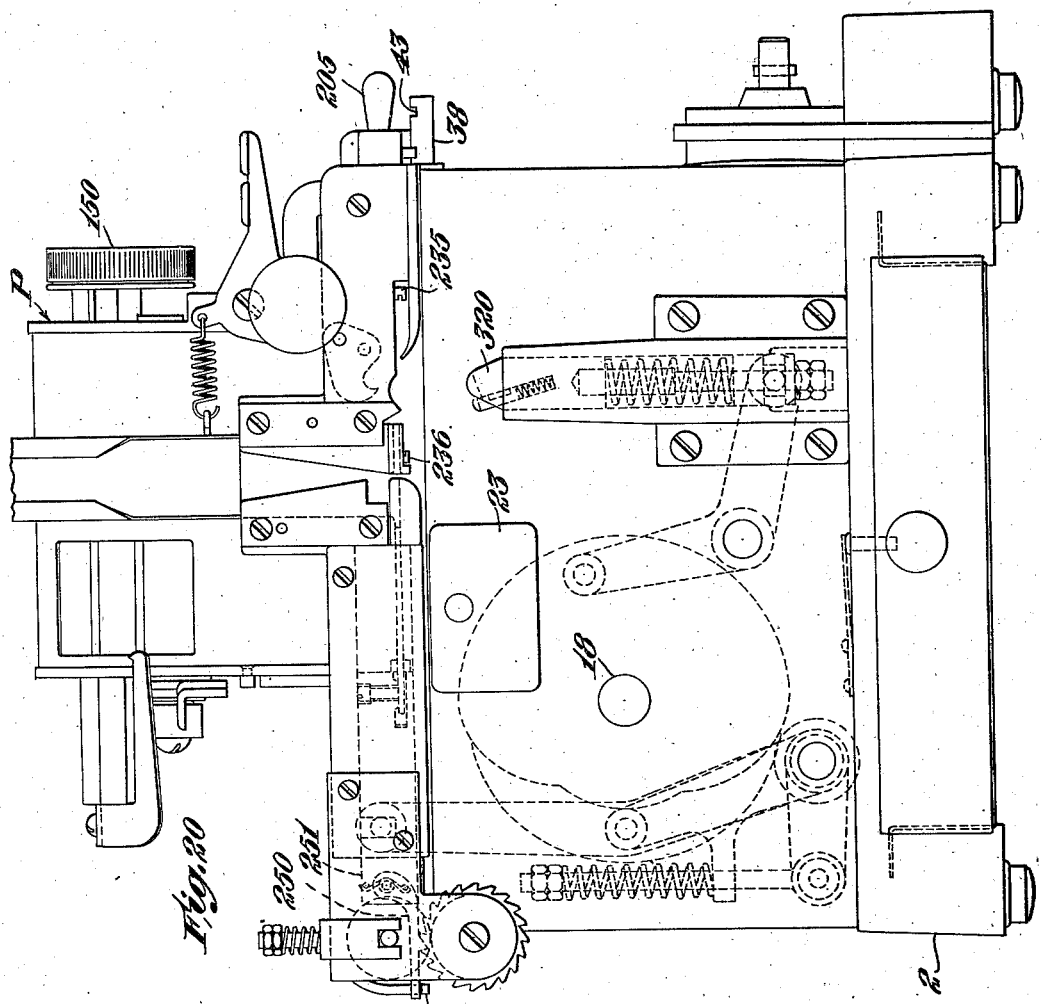

Patented Aug. 2, 1938

2,125,626

UNITED STATES PATENT OFFICE 2,125,626

PRINTING AND PINNING MACHINE

Carl A. Flood, Framingham, Mass., assignor to Dennison Manufacturing Company, Framingham, Mass., a corporation of Massachusetts Application May 29, 1936, Serial No. 82,423

12 Claims. (Cl. 101—288)

This invention relates to a combined printing and attaching machine and in general provides an improved machine of the general type disclosed in my prior copending application Serial No. 36,989, filed August 20, 1935. In some respects the present invention is also an improvement upon the machines shown in my copending application Serial No. 565,466, filed September 28, 1931, and my United States Patent No. 2,023,045, issued December 3, 1935. In general such machines are provided with means to feed a ticket strip to a cutting and printing mechanism and to feed a pin strip to an attaching station where the severed and printed ticket is received and secured to a suitable article such as an article of wearing apparel.

The present invention particularly provides a machine whereby one ticket may be severed from the strip and printed during a single cycle of operation while a preceding ticket is being attached to the article of wearing apparel or the like, and, in order to facilitate the printing of small lots of tickets without waste and without danger of applying an incorrectly printed ticket to an article, the machine is provided with means to interrupt the feeding of the strip when the last ticket of a series is being printed so that wasting of a ticket is avoided. Such means is also arranged so that, when the printing of the new set of tickets is started, a pin is not fed into the attaching station during the first cycle of the new series, i. e., before a ticket has been received by the station.

The present invention affords improved and simplified ticket feeding and printing mechanism, the feeding mechanism being particularly adapted to feed either long or short tickets which may be printed either once or twice, while the printing mechanism is provided with a plurality of readily adjustable printing wheels so that the printing indicia may be selectively varied without necessitating the removal of a printing head from the machine or any operations that are likely to soil the hands of the operator.

Preferably the printing mechanism is also provided with readily adjustable means consisting of a plurality of printing wheels in order to print a price indication at the end of a ticket. Thus a ticket of the general type disclosed in my copending application Serial No. 43,205, filed October 2, 1935, may be printed by a machine of this character, the price marking being arranged in a line transversely of the other lines of indicia upon the ticket and being disposed at the end of the ticket. A ticket of this type may readily be re-marked by a device of the character disclosed in my United States Patent No. 2,014,727, issued September 17, 1935. The part of the ticket bearing the original price mark may then be severed from the ticket and a substitute or different price mark printed thereon.

A further feature of the printing mechanism is the arrangement of the printing wheel assembly so that the indicia is printed in lines of type consisting of staggered groups of symbols, thus permitting a single operation with printing wheels to impress two lines of information upon the ticket and permitting an unusually compact grouping of the indicia upon the printed ticket. Accordingly this invention avoids the necessity for transverse movement of the ticket, such as is disclosed in my above-identified application Serial No. 36,989. As a result, the present invention permits the ticket to follow a substantially straight line path through the cutting, printing and attaching stations so that simplicity of construction and operation are provided. The present invention also provides adjustable guide means to accommodate tickets of various widths and provides strip and ticket feeding means particularly adapted to cooperate with such adjustable guide means. Further advantageous features of the invention relate to the provision of simple cam and linkage mechanisms and structural and mechanical details which permit a simple, compact and conveniently controlled mechanism to be provided despite the several operations which may be performed by the machine and despite the various adjustments which are provided to take care of different operating conditions.

In the accompanying drawings:

Fig. 1 is a side elevation of a machine constructed in accordance with the present invention;

Fig. 2 is a plan view of a portion of the machine with certain parts removed;

Fig. 3 is a similar view but with many additional parts removed;

Figs. 8 and 9 are similar views of portions of the printing and inking mechanism;

Fig. 12 is a front elevation of one end of the printing assembly;

Fig. 13 is an elevational detail of the secondary printing assembly which prints the price marks upon the tickets;

Fig. 14 is an end elevation of the assembly shown in Fig. 13;

Fig. 15 is a section indicated by line 15—15 of Fig. 14;

Fig. 16 is a horizontal section of the assembly shown in Fig. 13;

Figs. 17 and 18 are detail views of portions of the control means for the mechanism shown in Fig. 13, parts being shown in elevation and in section;

Fig. 20 is a front elevation of the machine, parts being broken away and removed; and Figs. 21, 22, 23 and 24 are plan views showing various sizes and styles of tickets which may be printed by a machine of the present type.

Figure 4:
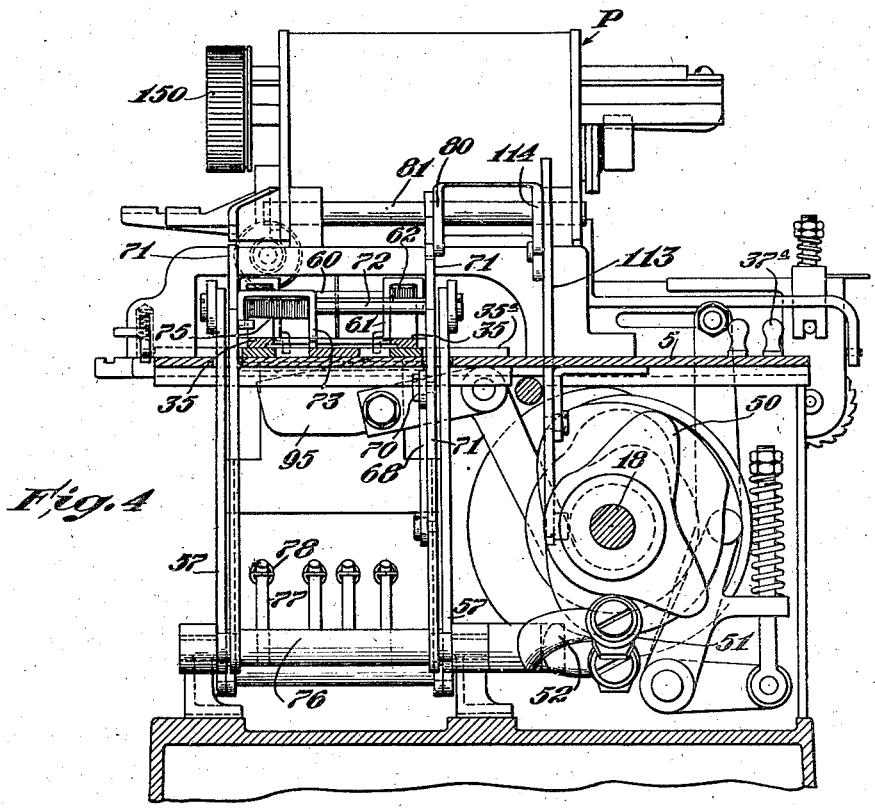
Fig. 4 is a section indicated by line 4—4 of Fig. 1.

Referring to the accompanying drawings which illustrate a machine exemplifying the principles of this invention, the numeral 1 designates a frame having a suitable base 2 with an upright skeletonized wall portion 3 adjoining the front of the machine. The frame also includes an upper plate or table 5 having certain parts cut away for purposes which will be described. In practice the machine is provided with suitable detachable covering plates (not shown) which may be disposed between the base and the table 5.

The driving mechanism for this machine is of the general type disclosed in my above-identified copending application Serial No. 36,989 having a driving motor 10 which is effective through a one-revolution clutch mechanism 17 in driving a single operating shaft 18. The details of such a clutch mechanism are fully disclosed in my above-identified application Serial No. 565,466. As more fully disclosed in that application, a plate 23 is disposed at the front of the machine near the anvil 320 which forms part of the pinning mechanism. When the operator desires to have the machine perform one cycle of operations, a garment or the like ordinarily is placed over the anvil 320 and the plate 23 simultaneously is pushed inwardly, thus permitting the continuously operating motor 10 to be effective through the clutch mechanism 17 in causing one revolution of the shaft 18, it being understood that the motor is connected to the shaft by suitable reduction gearing of the type disclosed in my above-identified applications so that the shaft 18 rotates at a rather slow speed.

The tickets preferably are received from a coiled strip 30 wound on a suitable support 31 which is mounted in the magazine 32 at the top of the machine. In normal operation, the end of the ticket strip extends downwardly from the magazine into a suitable guide track provided by the similar guides 35. As shown in Figs. 2, 3 and 4, these guides are disposed upon the table 5, being grooved to retain the ticket strip and being provided with oppositely disposed U-shaped portions 35ª which are arranged to afford room for the movement of the platen. The front portions 35ᵇ of the guides, however, are aligned with their rear rabbeted rail sections. One of the guides 35 is fixed to an adjusting and retaining strip 37 while the other guide is fixed to a similar strip 38. These strips, as shown in Fig. 1, are disposed in a transverse groove in the table 5, being provided with upstanding knobs 37ª and 38ª to facilitate their sliding movement transversely of the table. A suitable spring controlled locking pawl 40 having a finger piece 41 is engageable in grooves 43 extending transversely of the table relatively to each other, thus to vary the spacing of the guides 35 to accommodate tickets of different widths. The strips 37 and 38 and guides 35 may be locked in place in any relative position wherein two of the grooves 43 register with each other so that they may cooperate in receiving the end of the locking pawl 40. Suitable marks 44 are provided upon the adjoining ends of the strips 37 and 38 to facilitate their relative adjustment in this manner. Thus, as shown, the strips and guides may be adjusted to accommodate tickets of three different widths.

Figure 6:
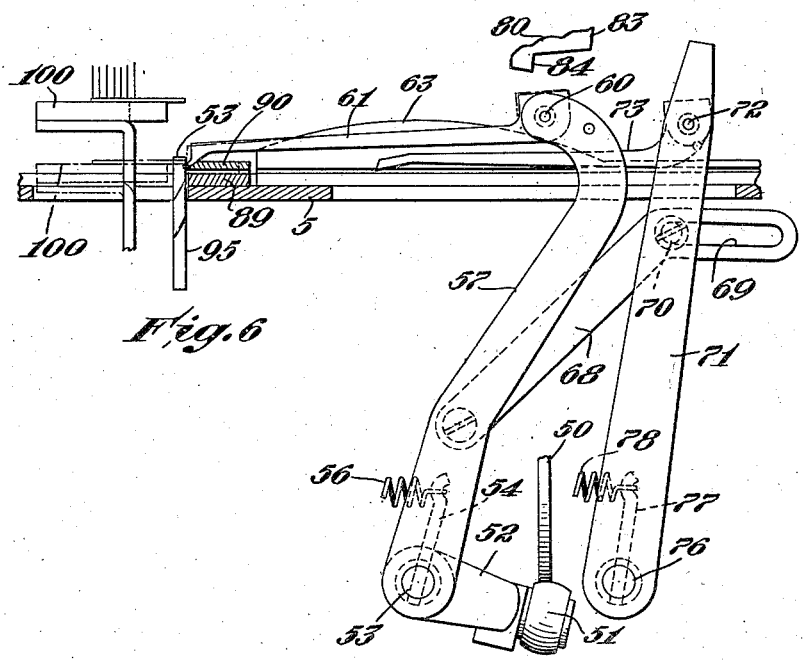
Figs. 6 and 7 are elevational views of the strip and ticket feeding mechanism, portions of certain cooperating parts also being shown in elevated section and various parts being shown in different positions by dot and dash lines.
Figure 7:
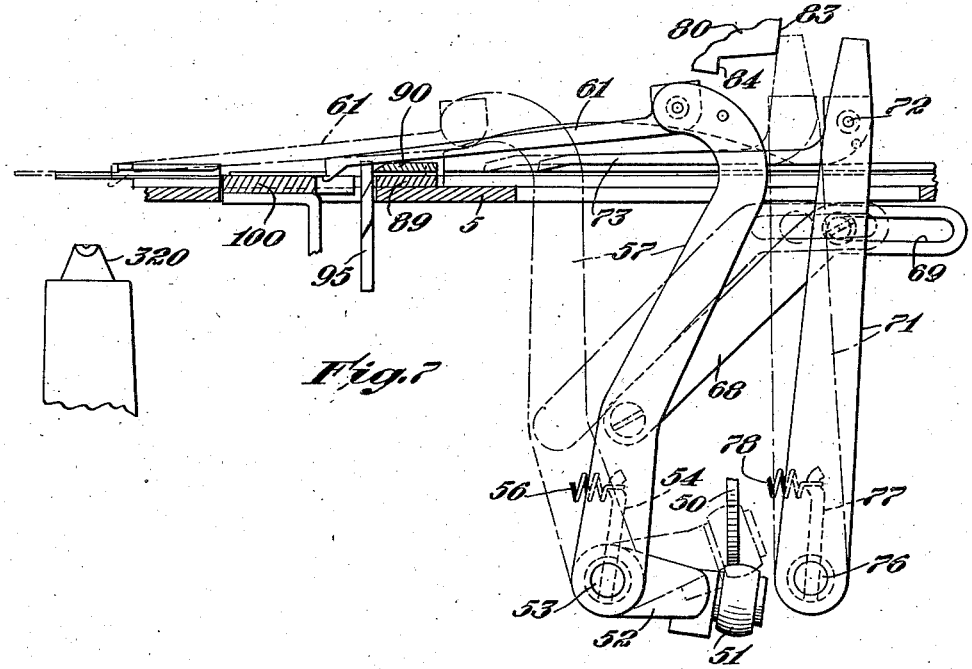

A cam 50 is mounted upon the shaft 18 and operates the strip and ticket feeding members. For an understanding of the operation of this portion of the machine, reference may be had to Figs. 1, 2, 4, 5, 6 and 7. A roller follower 51 engages the cam 50, this follower being rotatably mounted upon the end of an arm 52 which extends from a cross shaft 53 rotatably mounted upon the frame of the machine. An arm 54 fixed to shaft 53, shown in dotted lines in Figs. 6 and 7, is connected by a tension spring 56 to a suitable part of the frame of the machine, thus tending to hold roller 51 against cam 50 and tending to swing the similar arms 57 in an anticlockwise direction as viewed in Fig. 6, these arms being fixed to the ends of the shaft 53 and being disposed at opposite sides of the ticket guides 35. The upper ends of these arms are connected by a rod 60 and ticket feeding fingers 61 are pivotally mounted upon this rod, the torsion springs 62 (Fig. 5) urging the outer ends of these fingers with their prongs 63 downwardly.

Figure 5:
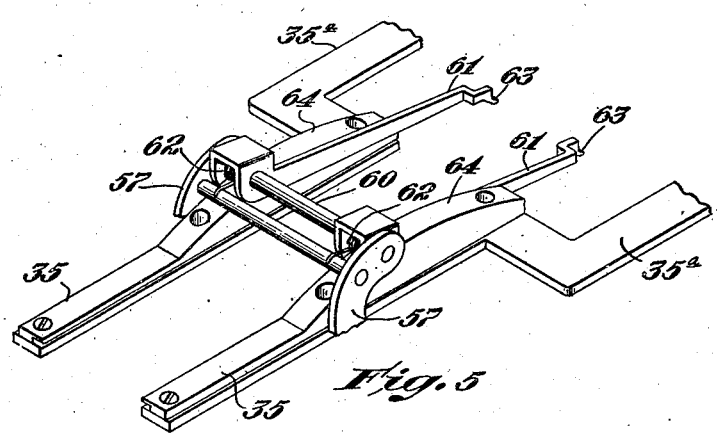
Fig. 5 is an isometric view of a portion of the ticket feeding and guiding mechanism.

As shown in Figs. 4 and 5, the fingers are provided with U-shaped portions which straddle the springs 62, and upstanding ribs 64 upon the guides 35 are received in these U-shaped portions of the fingers so that the latter move toward or away from each other as the guides 35 are adjusted. Accordingly the mechanism is particularly adapted to cooperate with a guide track adjustable to receive tickets of different widths.

One of the arms 57 has a pivotal connection with an angular link 68 (Figs. 6 and 7), the rear end of which has a slot 69 slidable relative to a pin 70. The latter projects from a control arm 71 which is one of a pair of similar arms (Fig. 2) disposed at opposite sides of the guides 35 and mounted on a cross shaft 76. The upper ends of these arms are connected by a rod 72 and a strip feeding pawl 73 has a pivotal mounting 74 on the rod 72, a suitable torsion spring 75, as shown in Fig. 4, urging the outer or forward end of this pawl downwardly. An arm 77 extends from the shaft 76 and is connected to a tension spring 78 which in turn is connected to a portion of the frame of the machine. Accordingly the spring 78 tends to swing the arms 71 in an anticlockwise direction as viewed in Figs. 6 and 7, thus tending to hold the pin 70 at the front end of the slot 69. Accordingly, when, due to the rotation of cam 50, the arms 57 are moved forwardly by the spring 56, the spring 78 tends to cause a corresponding movement of the arms 71. However, suitable stop means is provided to limit the movement of arms 71 so that these arms remain, for example, in such a position, as indicated by dot and dash lines in Fig. 7, while the arms 57 continue their forward movements, the slot and pin connection 69—70 permitting this relative movement of the arms 57 and 71.

The stop means which limits the forward movement of the arms 71 includes an adjustable member 80 pivotally mounted on a fixed pivot rod 81. The rear end of the arm member 80 affords one abutment surface 83 to engage the inner arm 71 to stop the latter and the feeding pawl 73 when a narrow ticket is being fed, while the member 80 is provided with a stepped construction to afford a second abutment surface 84 to engage the inner arm 71 and limit the movement of the latter and the pawl when a wide ticket is being fed.

While the specific operation of the ticket feeding means will be generally described in connection with the operation of other parts of the machine, it may now be pointed out that the spring 56 holds the roller 51 against the cam 50 so that depressions in the peripheral portion of the cam permit the spring 56 to cause the arms 57 and the feeding fingers 61 to move forwardly, as, for example, indicated by dot and dash lines in Fig. 7, the arms 71 being similarly drawn forwardly together with the feeding pawl 73 by the spring 78 until the stop surface 83 or 84 limits further forward movement of the arms 71 and the strip feeding pawl 73, whereupon the pin and slot connection 70—69 permits further movement of the ticket feeding fingers.

In this connection it is to be understood that the pawl 73 may be engageable in a recess in each ticket section which is provided in the manner disclosed in my copending application Serial No. 43,205 to facilitate pinning of the ticket. Thus, for example, the ticket may be formed of two plies and the recess may be provided by an opening extending through one of the plies. Thus in this respect the strip feeding means is similar to that disclosed in my copending application Serial No. 36,989.

Figure 10:
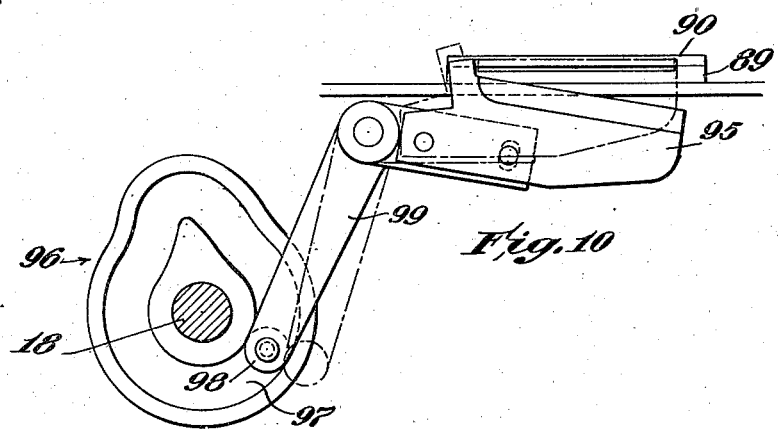
Fig. 10 is a view, partly in section and partly in elevation, showing the cutting mechanism and cooperating parts.

At the front end of the rear rail sections of the guides 35 a pair of small plates 89 and 90 (Fig. 7) are arranged to provide a slot to receive the end of the ticket strip. A knife 95 is movable between the front edges of these plates and a movable platen 100; this knife cooperates with the beveled edge of plate 90 in shearing tickets from the strip 30. As shown in Figs. 1 and 10, the shaft 18 is provided with a cam 96 which provides a groove 97 receiving a follower 98 at the end of one arm of a bell crank 99, the intermediate part of which is pivotally mounted upon the frame of the machine. The opposite end of this bell crank supports the knife 95. Thus the knife is moved upwardly between the platen 100 and the plates 89 and 90 once during each revolution of the shaft 18, i. e., once during each cycle of the machine.

Figs. 8 and 9 particularly illustrate the operation of the printing mechanism. Both the platen and the inking pad are operated by one cam during each cycle, but two cams are provided in order to permit adjustment of the machine so that either one or two printing operations may be effected. For this purpose a barrel 110 is slidably mounted upon the shaft 18 and provided with a peripheral groove 111 receiving a stud at the end of a pivotally mounted control lever 113. A locking arm 114 is pivotally mounted upon the rear shaft 81, being connected by a part 80ᵃ to the abutment member 80 (Fig. 2); the arm 114 has a lower edge provided with two notches engageable with a pin 115 upon the locking lever 113. Thus when the arm 114 is in such a position that the pin 115 engages one of the notches, one of the cams 120 or 120ᵃ on the barrel 110 is effective in controlling the printing and inking mechanism; when the other notch on the arm 114 engages the pin 115, the other cam is similarly effective.

Furthermore, since the locking arm 114 is connected to the abutment member 80, the position of the control lever 113 determines the position of the member 80; accordingly, when, for example, the lever 113 is in its rear position, as shown by dot and dash lines in Fig. 8, the member 114 is in its dotted line position and the member 80 is positioned so that the upper end of arm 71 will engage the abutment surface 84. Thus the pawl 73 is effective in advancing the strip a distance adequate for the feeding of a long ticket section. On the other hand, if the member 113 is in its forward position, indicated in full lines in Fig. 8, the abutment surface 83 is positioned to stop the arm 71 in the position illustrated in Fig. 7, so that the pawl 73 only advances the ticket strip a distance adequate for the feeding of a short ticket.

A transverse shaft 125 carries an arm 126 supporting a follower roll 127 which engages, for example, the edge of cam 120 (or of cam 120ᵃ), a suitable tension spring 128 tending to turn the shaft 125 in an anticlockwise direction as viewed in Fig. 8, thus holding the follower 127 against the cam. The arms 130 extend upwardly from the shaft 125 and have pins 131 received in upwardly and forwardly inclined slots 132 at the rear ends of rocking levers 133. The opposite ends of these levers support a suitable inking pad 134 while the intermediate portions thereof are pivotally connected to upwardly extending arms of bell cranks 138. The latter are supported upon a shaft 139 which carries an arm 140 that is controlled by a tension spring 141, the spring 141 tending to swing the bell cranks 138 in an anticlockwise direction as viewed in Fig. 8 and tending to move the rocking levers 133 forwardly. The lower arms of bell cranks 138 have pivotal connections with a bracket 135 which is vertically movable and supports the platen plate 100.

In the operation of this portion of the mechanism, the spring 128 holds the follower 127 against the edge of cam 120 so that, when a recessed portion of the periphery of the cam is engaged by the roller, the spring may swing the lever 130 forwardly, thus moving the pins 131 relatively to the levers 133, the pins each having a cam-like engagement with the diagonal slots at the ends of levers 133, so that inking pad 134 is swung upwardly into engagement with the printing symbols of the printing wheel assembly, this position being shown by dot and dash lines in Fig. 8. Thereupon the cam is effective in moving the arms 130 slightly in the opposite direction to rock the levers 133 so that the printing pad 134 moves downwardly away from the printing wheels to the position shown in full lines at the left of Fig. 9, whereupon the cam is effective in swinging the arms 130 to a substantial degree in a clockwise direction so that the pins 131 are received in the rear ends of slots 132, the swinging movement of the bell cranks 138 cooperating with this action of arms 130 in moving the pad rearwardly away from the assembly P and out of the position between the same and the platen 100. As this occurs, the bell cranks 138 are actuated by levers 133 to move the platen to printing position.

An arm 145 (Fig. 2) extends from the platen plate 100 and carries a thin vertically disposed sheet metal member 142, the lower edge of which is juxtaposed to the upper face of a ticket resting upon the platen, thus to engage the upper face of the ticket and to retain the ticket in fixed relation on the platen during the printing operation and while the ticket is out of engagement with the guides 35. This member 142 projects upwardly between wheels of the printing assembly P. To facilitate initial movement of the ticket beneath the member 142, its rear extremity is rounded as designated by numeral 143.

The printing assembly P is of the general character disclosed in my United States Patent No. 1,980,576, issued November 13, 1934, and in my prior copending application Serial No. 36,989, having a plurality of indicating wheels and a corresponding set of printing wheels, a suitable adjustable control knob 150 being provided so that any given indicating wheel and the corresponding printing wheel may readily be moved to desired position. Thus the combination of symbols in printing position can readily be varied without necessity for removing type or the like. Since the details of such a printing assembly have already been fully disclosed in the above-identified patent and copending application, the construction of this assembly will not be described in detail herein.

In accordance with this invention, however, a secondary printing assembly A is disposed at one end of the main assembly, being arranged to print a price indication on the end of a ticket of wide or intermediate size which is being printed. Thus while the main printing assembly P is printing a staggered line of symbols transversely of the ticket, the secondary assembly A is printing a single price line transversely of the staggered line, i. e., vertically at the end of the ticket.

As is evident from Fig. 12, the lowermost printing elements of the assembly A are spaced from the printing wheels 152 of the main printing assembly P. Accordingly a space is left between the price indication and the other symbols upon the printed ticket, this space being adequate to receive re-marked prices. The assembly A includes a suitable supporting bracket 160 upon which a set of exposed printing wheels 162 are rotatably mounted, a corresponding set of indicating wheels 163 being disposed in spaced relation to the printing wheels. A longitudinally movable and rotatable shaft 164 extends through the printing and indicating wheels and is provided with two similar collars 165 and 166, each of which is provided with a pin 168 (Fig. 17), these pins being receivable in the internal recesses 169 of the printing and indicating wheels. The shaft 164 is mounted in a slidable ratchet bar 167, angularly disposed faces of which are provided with ratchet teeth 170 (Figs. 16 and 18). Suitable locking rods 171, 172 and 173 are disposed between the collars 165 and 166 and adjoining the same, so that the rods are slidably received in the internal recesses 169 of the wheels, thus to lock each of the wheels against rotation except the corresponding wheels of each set which are being engaged by the pins 168 of collars 165 and 166. The rod 173 is also provided with an exposed extension 174 which is visible to the operator of the machine and defines the line of symbols upon the indicating wheels corresponding to the line of symbols in printing position upon the printing wheels.

A locking detent 180 has an end portion 181 engageable with the teeth at one side of the bar 167 (Figs. 14 and 16) and is provided with a finger piece 189 which normally engages an extension 188 of a second detent 191 which engages the opposite row of teeth upon the member 167. A spring 190 normally holds the part 181 in locking engagement with the teeth. However, when the member 189 is depressed, the member 181 is disengaged from the teeth and the opposite beveled member 191 engages the opposite teeth, thus moving the bar 167 a half step or a half tooth in one direction. As the member 189 is released, the member 181 returns to normal position and its beveled edge engages one of the corresponding teeth to cause a second half-step movement. Thus reciprocating movement of the finger piece 189 causes longitudinal movement of the bar 167. When the member 189 is held in partially depressed position, the detents 181 and 191 are both separated from the rack bar 167 so that the latter may be freely slid to desired adjusted position.

A knob 191 is secured to the end of the shaft 164 to permit its manual rotation and its longitudinal movement together with the rack bar 167, the locking bars 171, 172 and 173, and the collars 165 and 166. A spring-controlled detent 192 is engageable with a non-rotatable toothed member 194 disposed within the hollow end of the knob 191, thus tending to hold the knob and the shaft 164 in definite angular positions relative to the assembly A, so that the printing symbols on the printing wheels may be located in proper position and so that the assembly may be slid longitudinally to permit the pins 168 to engage internal recesses in adjoining wheels. Thus the knob 191 may be readily actuated to adjust any desired printing wheel and the corresponding indicating wheel, as desired, the knob being rotated to adjust the printing wheel which is being engaged by the corresponding pin 168 and the knob being slid longitudinally to move the pin 168 into engagement with another printing wheel, the detents 181 and 191 being actuated to permit such longitudinal adjustment. Due to the arrangement of the detent 192, a pair of wheels which are adjustably rotated are stopped so that their recesses are aligned with the recesses of adjoining wheels which are held in position by the locking bars 171, 172 and 173. Thus the knob and shaft 164 may readily be moved longitudinally to permit the pins 168 to engage adjoining wheels.

The rear of the entire printing assembly P is pivotally mounted upon the shaft 81 and a sheet metal arm 200 (Figs. 1, 11 and 19) is fixed to the rear part of this assembly and has an offset portion providing a rear abutment surface 201 which is movable into the path of the outer arm 71 of the strip feeding means. The front portion of the assembly P is mounted upon an eccentric 203 (Fig. 12) which is secured to a shaft 204 supporting a control handle 205. Thus, when the knob is in the position shown in full lines in Figs. 1 and 11, the assembly P is in printing position, but, when the knob is swung to the position indicated by dot and dash lines in Fig. 11, the body portion of the printing assembly is swung upwardly about the shaft 81 so that the arm 200 moves downwardly and its rear extremity or abutment surface 201 is in the path of the upper end of the outer arm 71, thus to block the forward movement of the latter when the cam 50 operates the ticket feeding means, the slot and pin connection 69—70 permitting this action, so that the ticket feeding fingers 61 feed a ticket, but so that the pawl 73 is not advanced to feed the ticket strip. Accordingly when the parts are in this position, a ticket which has been printed may be fed from the platen to the attaching mechanism but the operation of the strip feed is interrupted.

The pinning mechanism is of the general type disclosed in my above-identified application Serial No. 36,989, the pin strip feeding mechanism being normally actuated by a pawl 250 (Fig. 20) pivotally mounted upon a sliding actuating rod 251.

However, the ticket guide portions 35$^b$ are arranged to hold a ticket in the pinning position, one of these guides being provided with a spring controlled grooved element 235 (Figs. 3 and 20), thereby firmly to position the ticket while it is at the pinning station. The grooved element 235 has a limited pivotal movement relative to the body portion of the corresponding guide and is yieldably controlled by a coil spring 236 shown in Fig. 3. It is evident that the element 235 performs the same general function as the element 314 in my prior copending application Serial No. 36,989, but that the present arrangement permits the pinning mechanism readily to receive tickets of different widths.

Figure 11:
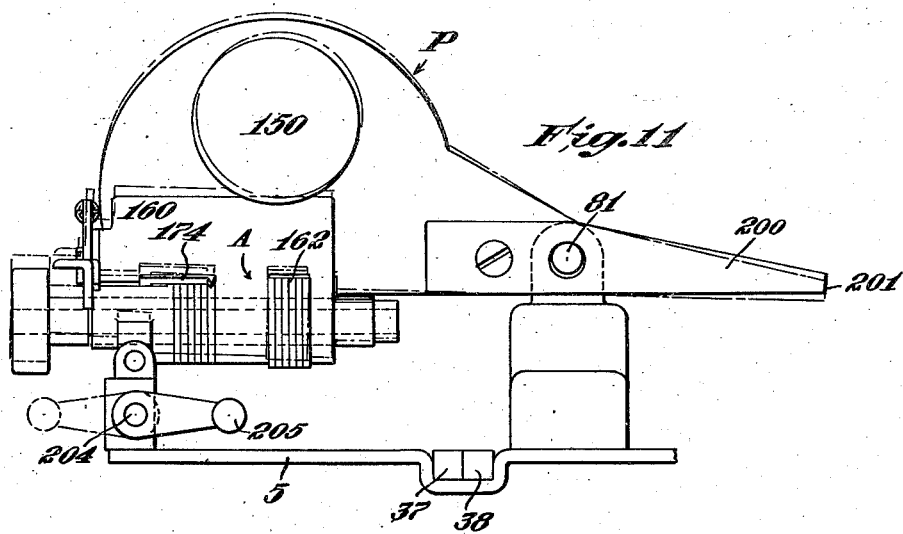
Fig. 11 is an end elevation of the printing assembly, an optional position of the latter being shown by dot and dash lines.

When the printing assembly P is moved upwardly to its inoperative position, illustrated in Fig. 11, an arm 253, which is fixed to the front of this assembly, lifts the pawl 250 away from the notched wheel 254 which it normally actuates, so that operation of the pinning mechanism by the cam means in the general manner disclosed in my above-identified application does not result in the advance movement of the pin strip to bring another pin into the attaching station as would otherwise normally occur. Accordingly the lever 205 may be actuated when the last ticket of a given set is to be secured to a garment or the like. Thus the printing assembly is moved out of its normal printing position and the strip feeding pawl is prevented from advancing the strip during this final cycle of the series, but the printed ticket is advanced to the attaching station where the pin which was previously advanced to this station is inserted through the ticket and the garment disposed over the anvil 320, thus securing the last ticket of the series to the garment or the like. At the completion of this cycle, however, the detent 250 is not effective in causing advance movement of the pin strip so that another pin is not disposed in the attaching station ready for insertion during the next operating cycle. Thereupon the knob 205 may be swung to its normal position so that the printing assembly, the pin strip advancing means, and the strip feeding pawl may operate in the normal manner.

When the printing mechanism has been reset to provide a proper arrangement of symbols for printing the new set of tickets, the first operation of the new series may be performed. During this cycle the strip is advanced, severed, and the severed section printed in the usual manner, but there is no printed ticket being concomitantly advanced to the attaching station and acted thereon. While the pin-inserting mechanism is actuated during this cycle, there is no pin to be engaged thereby and thus there is no pin wasted or jammed in the mechanism. As the first cycle of the new series is completed, the pin strip advancing means is again actuated to bring a pin to the attaching station so that the succeeding cycles of operation may proceed in the normal manner.

Figure 19:
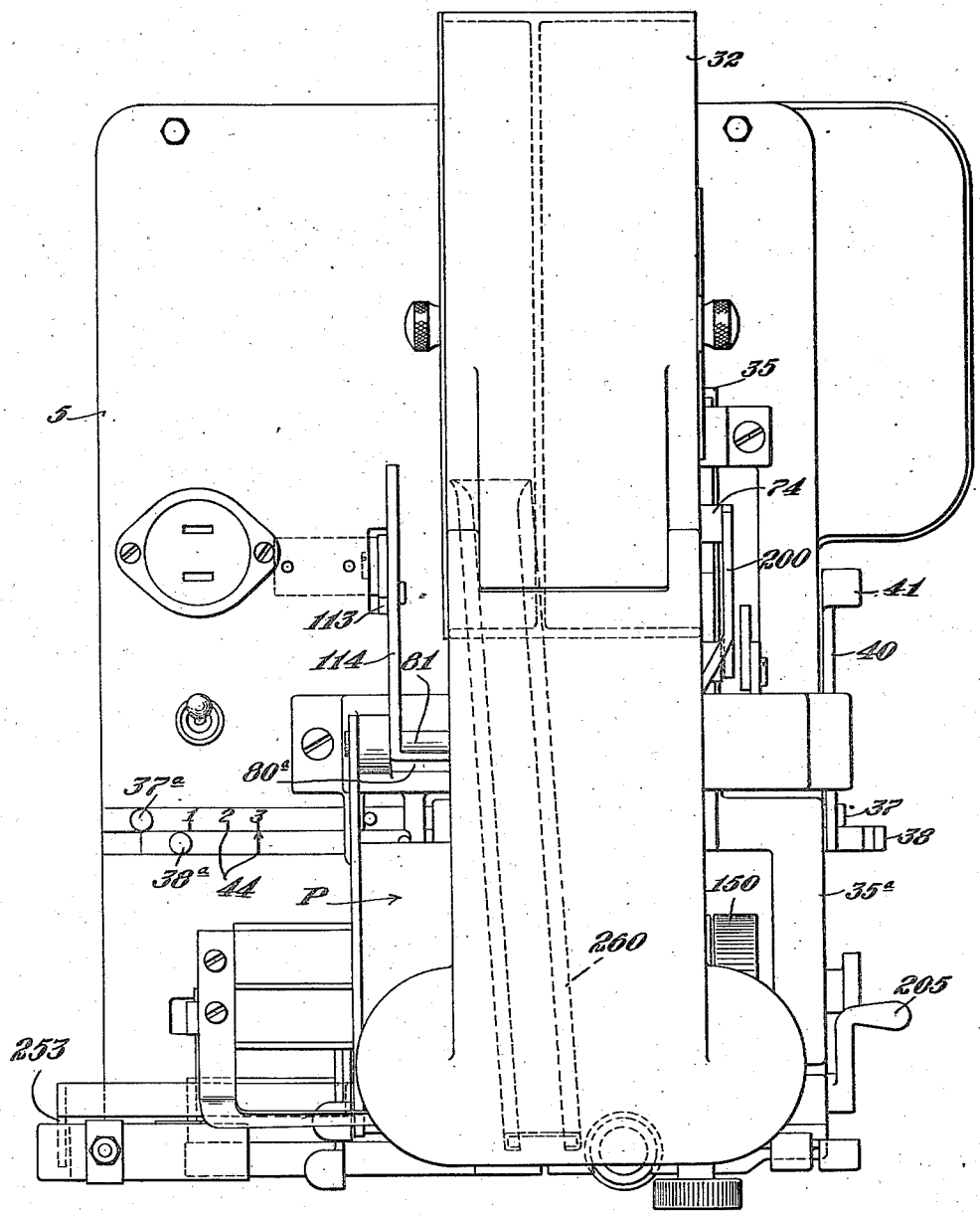
Fig. 19 is a top plan view of the machine.

Due to the arrangement of a machine of this character to receive relatively wide tickets, if desired, the pin strip preferably follows a somewhat laterally inclined or diagonal path which is determined by guide means extending downwardly from the reel on which the strip is wound to the attaching station, such diagonal guide means being shown in Fig. 19 and designated by numeral 260. Thus, although a relatively wide ticket may be printed and attached by the machine, the pins are directed into the attaching station in a proper position laterally of the machine to permit the proper attaching of either a wide or narrow ticket.

Figs. 21, 22, 23 and 24 illustrate various forms of tickets which may be printed by a machine of this character. Thus the ticket T is a long ticket, i. e., has two similar sections provided with duplicate indicia consisting of staggered lines of type printed by the main printing assembly P with price markings extending transversely of the respective ticket sections which are printed by the assembly A, it being noted that there is a space between each price marking and the staggered line of symbols upon the corresponding section, thus affording room for the subsequent insertion of remarked prices.

Each ticket is provided with a recess R to receive the tip of an attaching pin in the general manner disclosed in my above-identified application Serial No. 43,205, this recess also being engageable by the strip feeding pawl 73.

The ticket T$^1$ is similar to the ticket T except that it is a short ticket, i. e., comprising but a single section having a recess therein to receive the tip portion of the pin. The ticket T$^2$ is of intermediate width and has narrower staggered lines of symbols thereon together with price markings extending transversely at its end. A ticket similar to the ticket T$^2$ but consisting of but a single section may be printed if desired. The ticket T$^3$ consists of two similar sections, one of which has a pin-receiving recess, and this narrow ticket merely carries staggered lines of indicia, being too narrow to receive a transverse price marking in spaced relation to such a staggered line. Obviously a short ticket similar to the ticket T$^3$ but consisting of a single printed section may be provided, if desired.

The various tickets illustrated in Figs. 21, 22, 23 and 24 are positioned laterally in the general relationship which their paths have to each other as such tickets pass through the machine, it being noted that, although tickets of three different widths are shown, the recesses which are engaged by the pawl 73 have the same lateral positioning relative to the machine.

In the operation of a machine of this character, a pin strip ticket is mounted in the reel above the machine in the usual manner, extending through the guide 260 so that its end is received by the attaching mechanism and the pin strip advancing means, while a suitable reeled ticket strip 30 is mounted on the support 31 beside the reeled pin strip, the end of the ticket strip being disposed in the track provided by the guides 35 which are adjusted transversely relative to each other in accordance with the width of the particular tickets which are to be printed. The first section of the strip is disposed so that the recess R therein may be engaged by the strip feeding pawl 73 as the latter starts its advance movement.

A normal operating cycle may be started by actuating the member 23. This is ordinarily done by the hand of the operator who is disposing a garment or the like over the anvil 320 in position for reception of a pin ticket. Actuation of the member 23 causes the engagement of the one-revoluton clutch mechanism which causes one revolution of the shaft 18.

When the shaft 18 starts its rotation, the cam groove 97 is effective in causing the cutter 95 to sever the advanced ticket section, at least a portion of which is resting on the platen 100 (Fig. 6). As this occurs, the cam 120 may cause the inking pad 134 to engage the printing wheels in the manner which has been described, the pad then moving downwardly due to the inclined slot 132 at the end of each rocking lever 133 and a slight clockwise movement of the arms 130 as viewed in Fig. 8. When the pad has thus been separated from the printing wheels, the arms 130 are moved rearwardly to the position indicated by dot and dash lines in Fig. 9, the cam 120 being shaped to permit this movement of the parts by the spring 128. Thus the pad is spaced from the printing assembly.

As this movement is completed, the bell cranks 138 are swung in a clockwise direction, as viewed in Fig. 9, thus causing the bracket 148 to move the platen 100 to printing position, and causing the first printing of the ticket. As the platen is thus juxtaposed to the printing assembly, the feeding fingers 61 are slightly advanced by the arms 57 which are controlled by spring 56 and cam 50. Thus the ends of the fingers 63 are positioned as indicated in dot and dash lines in Fig. 6. When the platen returns to its normal position, the edge of the ticket is engaged by the tips of the fingers 61, the ticket being shown in this position by dot and dash lines in Fig. 6. While this is occurring, the inking pad 134 is again advanced to engage the printing wheels and the feeding fingers 61 move the ticket forward slightly to the position shown in dot and dash lines in Fig. 7, in which position of the parts, the tips of the fingers 61 are received in slots formed in the rear part of the platen 100. The printing assembly may then operate in the manner which has been described, so that after the inking pad has again been moved away from the printing wheels, the platen is lifted to cause the printing of the second ticket section.

When the platen again returns to its normal position, the fingers 61 may be advanced substantially to the position indicated in dot and dash lines in Fig. 7, whereby the printed ticket is disposed in the attaching station. During the advance movement of the ticket feeding fingers, the arms 71 may be swung forwardly by the spring 76, thus advancing the strip feeding pawl 73 a distance determined by the position of the abutment member 80. Thus when a long ticket is being printed the arm 71 will move forwardly until it engages the second abutment surface 84, and the pawl 73 will move a distance sufficient to permit the feeding of the ticket strip a distance equal to the length of the long ticket. While the strip is being severed and the severed section being printed in the manner which has been described, the attaching mechanism is operating to attach a preceding printed ticket to a portion of an article disposed at the attaching station.

When a short ticket is being printed, the abutment surface 83 is positioned to engage the arm 71 in the manner which has been described, so that the ticket strip is fed a shorter distance corresponding to the length of a shorter ticket. The movements of the ticket feeding fingers may be similar in such a cycle to those described with reference to the cycle employed for a long ticket, but the platen and inking pad actuating means is then controlled by the cam 120ª rather than the cam 120, so that there is but a single printing operation and a single inking operation during the cycle for the short ticket. When a short ticket is printed, it is positioned in the manner shown in full lines in Fig. 7, i. e., it is spaced materially from the severed ticket strip.

Obviously, when it is desired to adjust the machine to accommodate long rather than short tickets, or vice versa, it is merely necessary to lift the member 114 so that the control lever 113 (Fig. 8) may be swung to the other of its two positions. Thus the member 80 which is integrally connected to the member 114 is positioned to stop the arm 71 and consequently the pawl 73 after the latter has traveled a proper distance to feed the strip an extent corresponding to the distances between the recesses R in successive ticket sections.

When a new set of tickets is to be printed, the control knob 205 is actuated so that the last printed ticket of the first set may be attached, although no additional ticket is printed. Thus the printing assembly P is disposed above its normal operative position and the stop member 260 is positioned to prevent advance movement of the outer arm 71 and consequent movement of the strip feeding pawl 73. As soon as the last cycle of the series has been effective in attaching the last printed ticket, the control knob 205 may be returned to its normal position, thus permitting the parts controlled thereby to return to their normal positions. The printing wheels may then be adjusted to print the desired indicia upon the new series of tickets and the control member 23 may again be actuated to start the first cycle of the new series, whereupon a ticket is severed, printed and advanced to the attaching station. During this cycle, however, there is no printed ticket at the attaching station, and due to the movement of the pawl 250 out of its normal position during the last cycle of the preceding series, a pin has not been advanced to the attaching station.

I claim:

1. In a machine of the class described including a cutter for severing a ticket from a strip and printing mechanism for printing a severed ticket, strip and ticket feeding and guiding means comprising guides to engage the edges of the strip and ticket, said guides being adjustable toward and away from each other to accommodate strips and tickets of different widths, said printing mechanism including a movable platen to support the ticket, said guides having aligned end portions and having intermediate portions in the vicinity of the platen out of alignment with said end portions, said intermediate portions being arranged so that the width of the platen may be greater than the distance between the end portions of the guides when the latter are nearest to each other to receive a narrow ticket.

2. In a machine of the class described including a cutter for severing a ticket from a strip and printing mechanism for printing a severed ticket, strip and ticket feeding and guiding means comprising guides to engage the edges of the strip and ticket, said guides being adjustable toward and away from each other to accommodate tickets of different widths, said feeding means including a feed pawl adapted to engage a recess in a ticket section that subsequently receives an attaching element at the attaching station, said pawl being movable along a generally straight line path which is unaffected by the adjustment of the guides, said means also including ticket feeding elements movable toward and away from each other in response to a corresponding movement of the guides.

3. Machine of the class described comprising strip and ticket feeding and guiding means, a cutter to sever a ticket from the strip, printing mechanism to print a severed ticket, said means including guides to engage the edges of the strip, said printing mechanism including a ticket supporting platen and a cooperating printing assembly having symbol impressing elements, said platen and assembly being relatively movable, said means also including a reciprocating feeding pawl, a part connected to the pawl, spring means tending to advance said pawl, and cam means reacting against the spring means to limit the advance movement of the pawl, the printing assembly being pivotally mounted, an abutment member connected to said assembly, said assembly being movable about its pivotal mounting away from its normal printing position while the abutment member is simultaneously movable into the path of said part thus to prevent advance movement of the pawl under the influence of the spring means.

4. In a machine of the class described including a cutter for severing a ticket from a strip and printing mechanism for printing a severed ticket, strip and ticket feeding and guiding means comprising guides to engage the edges of the strip, a feeding pawl to advance the strip, feeding fingers to advance the ticket, and linkage to actuate said pawl and fingers including a pair of arms to actuate the pawl and a pair of arms to actuate the fingers, said guides being adjustable to accommodate tickets of different widths, the arms of each pair being disposed at opposite sides of the ticket guides and being connected by a bar, the pawl being mounted on the bar connecting the corresponding pair of arms and the fingers being mounted on the bar connecting the other pair of arms.

5. In a machine of the class described including a cutter for severing a ticket from a strip and printing mechanism for printing a severed ticket, strip and ticket feeding and guiding means comprising guides to engage the edges of the strip, a feeding pawl to advance the strip, feeding fingers to advance the ticket, and linkage to actuate said pawl and fingers including a pair of arms to actuate the pawl and a pair of arms to actuate the fingers, said guides being adjustable to accommodate strips of different widths, the arms of each pair being disposed at opposite sides of the ticket guides and being connected by a bar, the pawl being mounted on the corresponding bar and the fingers being slidably mounted on the other bar, said guides having portions in interfitting engagement with parts of the fingers, whereby the spacing of the fingers is varied in response to adjustment of the guides.

6. In a machine of the class described including a cutter for severing a ticket from a strip and printing mechanism for printing a severed ticket, strip and ticket feeding and guiding means comprising guides to engage the edges of the strip, a feeding pawl to advance the strip, feeding fingers to advance the ticket, and linkage to actuate said pawl and fingers including a pair of arms to actuate the pawl and a pair of arms to actuate the fingers, said guides being adjustable to accommodate strips of different widths, the arms of each pair being disposed at opposite sides of the ticket guides and being connected by a bar, the pawl being mounted on the corresponding bar and the fingers being mounted on the other bar, and means to vary the length of the path of movement of the pawl so that either long or short tickets may be fed thereby.

7. Machine of the class described comprising strip and ticket feeding and guiding means, a cutter to sever a ticket from a strip being fed by said means, printing mechanism to print a severed ticket, said means including guides to engage the edges of the strip, a feeding pawl to advance the strip, feeding fingers to advance the ticket, and linkage to actuate said pawl and fingers including a pair of arms to actuate the pawl and a pair of arms to actuate the fingers, said guides being adjustable to accommodate tickets of different widths, the arms of each pair being disposed at opposite sides of the ticket guides and being connected by a bar, the pawl being mounted on the corresponding bar and the fingers being mounted on the other bar, said printing mechanism being arranged so that it may be rendered inoperative, and a stop associated with said printing mechanism and being movable into the path of one of the arms which actuate the pawl to prevent advance movement of the pawl when said mechanism is thus rendered inoperative.

8. Machine of the class described comprising strip and ticket feeding means, printing mechanism to print a severed ticket, said means including a strip feeding pawl, a part movable with the pawl, spring means tending to advance said pawl, cam means reacting against the spring means to limit the advance movement of the pawl, an abutment member having two abutment surfaces and being movable to a position to block advance movement of said part and pawl, so that the pawl may either move through a long path when long tickets are being printed or through a short path when short tickets are being printed, and means for rendering the printing mechanism inoperative while simultaneously preventing the advance movement of the pawl under the action of the spring means.

9. Machine of the class described comprising strip and ticket feeding and guiding means, a cutter to sever a ticket from a strip being fed by said means, printing mechanism to print a severed ticket, said means including a ticket feeding finger, a strip feeding pawl, spring means tending to advance said pawl, cam means reacting against the spring means to limit the advance movement of the pawl, said finger being movable to advance a ticket from a first to a second printing position, said printing mechanism being adjustable either to print a ticket once or twice, a control member for thus adjusting the printing mechanism, said member also being effective in causing the advance movement of the pawl to be limited when a ticket is to be printed only once, whereby a long ticket may be printed twice and the strip may be advanced a distance corresponding to the size of the long ticket or a short ticket may be printed once and the strip may be advanced a corresponding distance.

10. In a printing machine of the class described, said machine including a cutter for severing a ticket from a strip and printing mechanism for printing a severed ticket strip, ticket feeding and guiding means comprising guides to engage the edges of the strip and ticket, said guides being movable relative to each other to accommodate strips and tickets of different widths, said means also comprising a pair of ticket feeding elements engageable with the severed edge of a ticket, supporting means upon which said elements are mounted to be movable relative to each other transversely of the path of the ticket, said means providing cooperating surfaces which are engageable when the guides are adjusted relative to each other in order to cause a corresponding transverse movement of the ticket feeding elements, so that the elements are spaced a greater distance apart when feeding a wide ticket.

11. Ticket feeding and guiding mechanism for a machine of the class described comprising a frame, a pair of generally parallel guides for the opposite edges of tickets, ticket feeding means comprising a reciprocatory feeding element, a reciprocatory supporting and actuating part for said element, one guide being adjustable toward and away from the other guide so that the guides may accommodate tickets of different widths, said element being transversely movable relative to the direction of extent of the guides, the mechanism providing means associated with said guide and said element with cooperating surfaces engageable as the guide is adjusted to cause a corresponding movement of the element, said means being arranged so that the transverse distance between said guide and the feed element is the same in each of the adjusted positions thereof.

12. In a printing machine of the class described, strip and ticket feeding and guiding means including a strip feeding pawl, a part movable with the pawl, spring means tending to advance said pawl, cam means reacting against the spring means to limit the advance movement of the pawl, and abutment means providing spaced abutment surfaces selectively movable to either one of two positions in each of which one of said surfaces blocks advance movement of said part and pawl, so that the pawl may move either through a long path when long tickets are being printed or through a short path when short tickets are being printed.

CARL A. FLOOD.